(12) United States Patent
Ye et al.

(10) Patent No.: US 10,069,679 B2
(45) Date of Patent: Sep. 4, 2018

(54) METHOD, SYSTEM, AND DEVICE FOR INITIALIZING A MEDIA EQUIPMENT

(71) Applicant: Tencent Technology (Shenzhen) Company Limited, Shenzhen (CN)

(72) Inventors: Zhenrong Ye, Shenzhen (CN); Peng Hu, Shenzhen (CN); Yilan Liu, Shenzhen (CN); Xiang Liu, Shenzhen (CN); Bo He, Shenzhen (CN); Bo Song, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 571 days.

(21) Appl. No.: 14/465,229

(22) Filed: Aug. 21, 2014

(65) Prior Publication Data

US 2014/0372592 A1 Dec. 18, 2014

Related U.S. Application Data

(63) Continuation of application No. PCT/CN2013/090444, filed on Dec. 25, 2013.

(30) Foreign Application Priority Data

Jun. 14, 2013 (CN) .......................... 2013 1 0236324

(51) Int. Cl.
*H04L 12/24* (2006.01)
*H04W 4/50* (2018.01)
*H04W 12/06* (2009.01)

(52) U.S. Cl.
CPC ........... *H04L 41/0806* (2013.01); *H04W 4/50* (2018.02); *H04W 12/06* (2013.01)

(58) Field of Classification Search
CPC ................................ H04L 41/00; H04L 61/00
See application file for complete search history.

(56) References Cited

U.S. PATENT DOCUMENTS

2006/0166718 A1* 7/2006 Seshadri ................. H04M 1/05
455/575.2
2006/0184851 A1* 8/2006 Froidcoeur ......... H04L 12/2803
714/746

(Continued)

FOREIGN PATENT DOCUMENTS

CN 101360059 A 2/2009
CN 102263778 A 11/2011

(Continued)

OTHER PUBLICATIONS

International Search Report and Written Opinion for Application No. PCT/CN2013/090444 dated Apr. 3, 2014.

(Continued)

*Primary Examiner* — Shirley Zhang
(74) *Attorney, Agent, or Firm* — Tim Tingkang Xia, Esq.; Locke Lord LLP

(57) ABSTRACT

A method for initializing a media includes: obtaining an access point corresponding to a media equipment in a network sharing model; performing a network connection with the media equipment via the access point, and sending paring information to the media equipment via the network connection; accessing to network environment corresponding to the paring information, and paring a control terminal equipment with the media equipment in the network environment. A system includes: an obtaining module, configured to obtain an access point corresponding to a media equipment in a network sharing model; an access processing module, configured to perform a network connection with the media equipment via the access point, and send paring information to the media equipment via the network con- (Continued)

nection; a paring module, configured to access to network environment corresponding to the paring information, and pair control terminal equipment with media equipment in the network environment.

17 Claims, 10 Drawing Sheets

(56) References Cited

U.S. PATENT DOCUMENTS

| | | | |
|---|---|---|---|
| 2009/0327496 A1* | 12/2009 | Klemets | H04L 12/2818 709/227 |
| 2010/0284389 A1* | 11/2010 | Ramsay | G06F 17/30017 370/338 |
| 2011/0167460 A1* | 7/2011 | Tranchina | B60N 2/4876 725/75 |
| 2013/0212233 A1* | 8/2013 | Landry | H04M 1/7253 709/220 |
| 2014/0165112 A1* | 6/2014 | Freeman | H04N 21/4122 725/81 |
| 2014/0297815 A1* | 10/2014 | Rajapakse | H04L 65/4076 709/219 |
| 2014/0342660 A1* | 11/2014 | Fullam | H04N 7/181 455/3.06 |
| 2014/0366105 A1* | 12/2014 | Bradley | H04W 12/08 726/5 |
| 2016/0105418 A1* | 4/2016 | Zhang | H04W 48/08 726/5 |
| 2017/0104550 A1* | 4/2017 | Rajapakse | H04H 20/18 |

FOREIGN PATENT DOCUMENTS

| | | | |
|---|---|---|---|
| CN | 102932745 A | | 2/2013 |
| CN | 103019120 A | | 4/2013 |
| CN | 103037477 A | * | 4/2013 |
| CN | 103096306 A | | 5/2013 |
| CN | 103338193 A | | 10/2013 |

OTHER PUBLICATIONS

Search Report and Office Action issued by the State Intellectual Property Office of the Peoples Republic of China dated Dec. 2, 2014 for Chinese Patent Application No. 201310236324.0.

* cited by examiner

METHOD, SYSTEM, AND DEVICE FOR INITIALIZING A MEDIA EQUIPMENT

CROSS REFERENCE TO RELATED APPLICATIONS

This application is a continuation of PCT/CN2013/090444 filed Dec. 25, 2013, which designates inter alia the United States and claims priority to Chinese Patent Application No. 201310236324.0 filed Jun. 14, 2013, the disclosures of which are hereby incorporated in their entirety by reference.

FILED OF THE INVENTION

The present disclosure relates to the network application technology, more particularly to a method, system, and device for initializing a media equipment.

BACKGROUND OF THE INVENTION

With the development of network applications, a media equipment for playing media files, such as a sound box etc., will be controlled by running an application in a mobile device. For example, operations such as playing media files and adjusting volume etc. are performed by running run trigged media equipment in the mobile device.

In a network environment, it is needed to initialize the media equipment when the media equipment is run initially, at this time, the media equipment is as a hot point to make a network connection is performed between the mobile device and the media equipment. A setting page of the media equipment is loaded by entering a special mapping address to a browser of the mobile device, to perform a variety of network setting operations on the media equipment, making the media equipment access to the network environment, completing the media equipment initialization. However, this initialization process is relatively complicated, increasing the difficulty of operation.

In order to overcome the defect that the operation for initializing the media equipment is complicated, it is further provides following two means to achieve media equipment initialization. Wherein, the media equipment initialization may be achieved by a specific button on a router which supports WPS (Wi-Fi Protected Setup), and a specific button on the media equipment, or may be achieved by an additional setting a Bridge device. Although the two means both simplify the operation of the media equipment initialization, due to most routers do not support WPS, the router has to be replaced or a Bridge device has to be additionally added, thus increasing the cost of money.

SUMMARY OF THE INVENTION

In view of the above, directing to the technical problem of simplifying the operation of the media equipment initialization but with an increased cost of money, it is necessary to provide a method for initializing a media equipment, which can simplify the operation on initializing the media equipment and with a low cost of money.

Furthermore, it is necessary to provide a system for initializing a media equipment, which can simplify the operation on initializing the media equipment and with a low cost of money.

Furthermore, it is necessary to provide a device for initializing a media equipment, which can simplify the operation on initializing the media equipment and with a low cost of money.

Furthermore, it is necessary to provide a computer-readable storage medium for initializing a media equipment, which can simplify the operation on initializing the media equipment and with a low cost of money.

According to one aspect of the disclosure, a method for initializing a media equipment, applied to a control terminal equipment, includes the steps of:

obtaining an access point corresponding to a media equipment in a network sharing model;

performing a network connection with the media equipment via the access point, and sending pairing information to the media equipment via the network connection; and accessing to network environment corresponding to the pairing information, and pairing the control terminal equipment with the media equipment in the network environment.

According to another aspect of the disclosure, a method for initializing a media equipment, applied to a media equipment, includes following steps:

opening a network sharing model in the media equipment, to form a network connection whose access point is the media equipment with the control terminal equipment;

receiving pairing information sent by the control terminal equipment via the network connection, and accessing to network environment corresponding to the pairing information; and pairing with the control terminal equipment according to the pairing information in the network environment.

According to another aspect of the disclosure, a method for initializing a media equipment includes the steps of:

opening a network sharing model in the media equipment;

obtaining an access point corresponding to the media equipment in a network sharing model via a control terminal equipment;

performing a network connection with the media equipment according to the access point, and sending pairing information to the media equipment via the network connection;

receiving the pairing information via the media equipment, and accessing to network environment corresponding to the pairing information; and accessing the control terminal equipment to the network environment corresponding to the pairing information, and pairing the control terminal equipment with the media equipment in the network environment. According to another aspect of the disclosure, a system for initializing a media equipment includes:

an obtaining module, configured to obtain an access point corresponding to a media equipment in a network sharing model;

an access processing module, configured to perform a network connection with the media equipment via the access point, and send pairing information to the media equipment via the network connection; and a pairing module, configured to access to network environment corresponding to the pairing information, and pair a control terminal equipment with the media equipment in the network environment.

According to another aspect of the disclosure, a device for initializing a media equipment includes:

a network opening module, configured to open a network sharing model in media equipment, to form a network connection whose access point is the media equipment with the control terminal equipment;

a network accessing module, configured to receive pairing information, and access to network environment corresponding to the pairing information; and a media equipment pairing module, configured to be paired with the control terminal equipment according to the pairing information in the network environment.

According to another aspect of the disclosure, a system for initializing a media equipment includes:

a network opening module, configured to open a network sharing model in media equipment;

an obtaining module, configured to obtain an access point corresponding to a media equipment in a network sharing model via a control terminal equipment; an access processing module, configured to perform a network connection with the media equipment via the access point, and send pairing information to the media equipment via the network connection;

a network accessing module, configured to receive pairing information via the media equipment, and access to network environment corresponding to the pairing information; and a pairing module, configured to access to network environment corresponding to the pairing information via the control terminal equipment, and pair with the media equipment in the network environment.

According to another aspect of the disclosure, a computer-readable storage medium comprising an executable program executable by a processor, to control a method for initializing a media equipment, the method includes:

obtaining an access point corresponding to a media equipment in a network sharing model;

performing a network connection with the media equipment via the access point, and sending pairing information to the media equipment via the network connection; and accessing to network environment corresponding to the pairing information, and pairing the control terminal equipment with the media equipment in the network environment.

According to still another aspect of the disclosure, a computer-readable storage medium comprising an executable program executable by a processor, to control a method for initializing a media equipment, the method includes:

opening a network sharing model in the media equipment, to form a network connection whose access point is the media equipment with the control terminal equipment; receiving pairing information sent by the control terminal equipment via the network connection, and accessing to network environment corresponding to the pairing information; and pairing with the control terminal equipment according to the pairing information in the network environment.

The method, system, device, computer-readable storage medium for initializing a media equipment, achieves the media equipment initialization by obtaining an access point corresponding to a media equipment in a network sharing model; performing a network connection with the media equipment via the access point, and sending pairing information to the media equipment via the network connection; at this time, accessing to network environment corresponding to the pairing information, and pairing with the media equipment in the network environment. For a user, it is only needed to enter a corresponding network parameter to generate pairing information to complete the initialization, which greatly simplifies the operation of the media equipment initialization, and does not need to replace or add an additional equipment, ensuring a low cost of money.

DETAILED DESCRIPTION OF THE PREFERRED EMBODIMENTS

In order to make the purpose, technical solution and advantages of the present disclosure more clear, the present disclosure will be further described with reference to accompanying drawings and embodiments. It should be understood that the embodiments described herein are only used to illustrate the present disclosure, not intended to limit the present disclosure.

Figure 1:
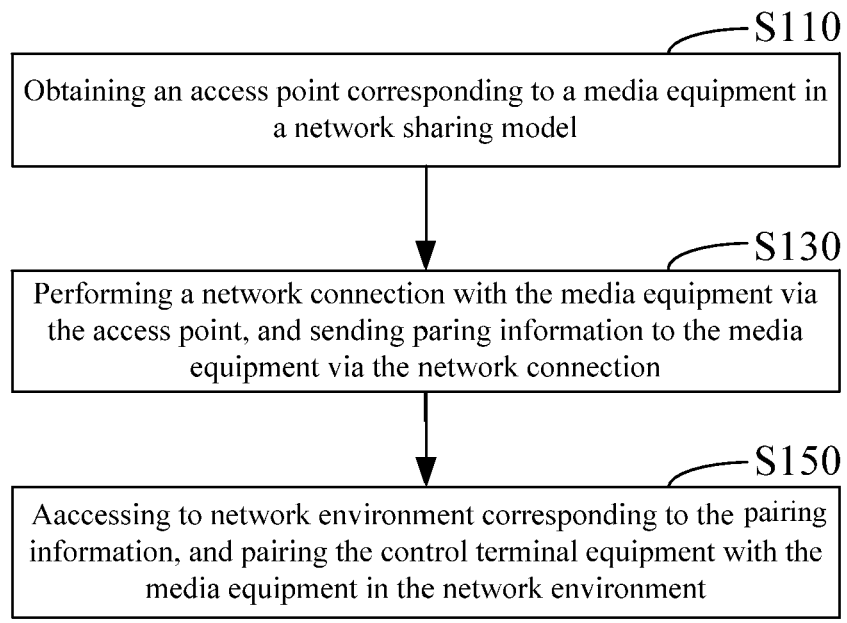
FIG. 1 is a flowchart illustrating a method for initializing a media equipment according to one embodiment of the present disclosure.

As illustrated in FIG. 1, in one embodiment, a method for initializing a media equipment, applied to a control terminal equipment, includes the following steps. Step S110, obtaining an access point corresponding to a media equipment in a network sharing model.

In the embodiment, the media equipment is embedded into a computer system, for playing media files such as audio files, video files etc. Network sharing model such as Wi-Fi Access Point model in the media equipment is opened, and at this time, one network which has the media equipment as a hot point is formed, and the network corresponds to a single access point. UPnP (Universal Plug and Play) model is started up to perform equipment finding to obtain an access point, wherein the access point may be obtained by searching a SSID (Service Set Identifier) name, or by searching a special field in a broadcast message.

In one embodiment, the step S110 particularly includes: accessing to a current network environment where the media equipment is located, and obtaining the access point corresponding to the media equipment in the network sharing model by performing equipment filtration in the current network environment.

In the embodiment, the control terminal equipment for remote controlling the media equipment is accessed to the network environment, and further a search according to SSID name or a custom protocol field is performed, to obtain the access point corresponding to the media equipment in the network sharing model. For example, after opening Wi-Fi function of the control terminal equipment, a variety of Wi-Fi lists obtained are lists formed by multiple access points. Accordingly, it is needed to filter the access points, to obtain the access point corresponding to the media equipment.

Furthermore, the SSID name can be searched by a key word, to obtain the access point whose SSID matches with the key word, and the access point is the access point corresponding to the media equipment in the network sharing model. For example, whether the key word exists in the SSID corresponding to the obtained access point by search is judged, if yes, then the access point is the access point corresponding to the media equipment in the network sharing model.

Furthermore, a filtration may be performed by a custom protocol field, that is, the custom protocol field is loaded in a communication protocol broadcast by Wi-Fi, and after a broadcast message is received, whether the message includes the custom protocol field is judged, if yes, the access point corresponding to the media equipment in the network sharing model may be obtained only according to the message, realizing accurate filtration of the equipment.

Step S130, performing a network connection with the media equipment via the access point, and sending pairing information to the media equipment via the network connection.

In the embodiment, the media equipment transforms a received network signal to Wi-Fi (wireless fidelity) signal, and sends out the Wi-Fi signal, and then the media equipment becomes an access point. The control terminal equipment is accessed to a network formed by the media equipment as an access point, to achieve the network connection with the media equipment via the access point. In addition, if the network is set a password, then a prompt message is pop-up to prompt the user to enter the password, and then identify verification is performed after the password entered by the user is obtained, and then after the verification the network whose access point is the media equipment can be accessed.

Furthermore, after the network connection between the media equipment and the control terminal equipment is established, a network parameter associated with the access point of original network environment will be obtained, such as SSID, a password, etc., to generate corresponding pairing information, and the pairing information is sent to the media equipment via the network connection through calling UPnP Action (Action function in UPnP).

Step S150, accessing to network environment corresponding to the pairing information, and pairing the control terminal equipment with the media equipment in the network environment.

In the embodiment, the control terminal equipment is accessed to the network environment corresponding to the pairing information through an operation trigged by the user, wherein, the operation trigged by the user is an operation on selecting the access point corresponding to the network environment and an operation on entering a password etc.

The media equipment receiving the pairing information will obtain the SSID, password and other information of the access point of the network environment which will be soon accessed to, and then a verification is performed by a password to enter to the network environment, then the media equipment and the control terminal equipment are both in the network environment, they can easily identify and be paired with each other, to complete media equipment initialization.

The method for initializing a media equipment will run in an application of the control terminal equipment, and the media equipment initialization can be achieved without the need of a complex page setting and a complicated operation, which simplifies the operation, reduces leaning cost on learning an operation on initializing the media equipment, and thereby reduces a threshold of initializing the media equipment.

The control terminal equipment for running the method for initializing a media equipment may be a smartphone, a tablet personal computer, and other mobile devices, or a personal computer, a laptop computer, not in the list one by one.

Further, the application corresponding to the method for initializing a media equipment will be run in one or more control terminal equipments, and the media equipment initialization is achieved by performing a program of the application, which greatly improves scalability, and does not require additional equipments.

Figure 2:
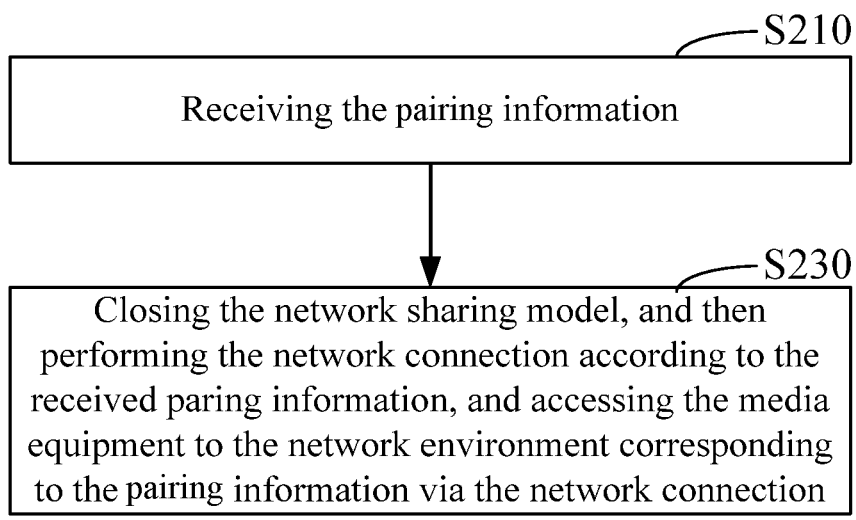
FIG. 2 is a flowchart illustrating a method for initializing a media equipment according to another embodiment of the present disclosure.

As illustrated in FIG. 2, in one embodiment, before the step S150, the method further includes:

Step S210, receiving the pairing information.

In the embodiment, the pairing information sent by the control terminal equipment is received.

Step S230, closing the network sharing model, and then performing the network connection according to the received pairing information, and accessing the media equipment to the network environment corresponding to the pairing information via the network connection.

In the embodiment, the network sharing model currently opened by the media equipment is closed, and accordingly, the network connection whose access point is the media equipment performed by the control terminal equipment will also be closed, and the original network environment where the control terminal equipment is located is switched to.

Figure 3:
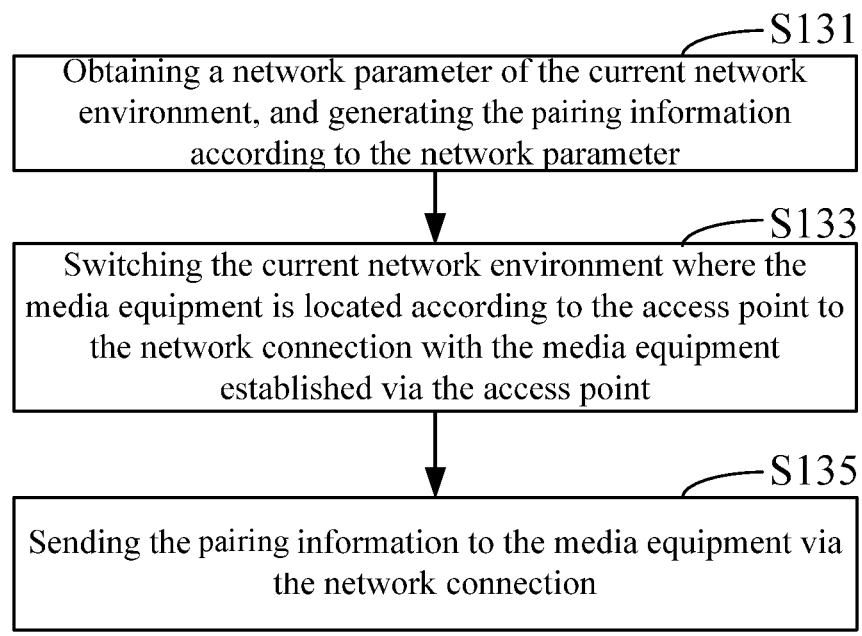
FIG. 3 is a flowchart illustrating a method for performing a network connection with the media equipment via an access point, and sending pairing information to the media equipment via the network connection according to one embodiment of the present disclosure.

As illustrated in FIG. 3, in one embodiment, the step S130 includes:

Step S131, obtaining a network parameter of the network environment, and generating pairing information according to the network parameter.

In the embodiment, the network parameter corresponding to the network environment is obtained, and the network parameter is used to announce the network environment where the media equipment will be accessed soon and to achieve the assessment of the media equipment to the network environment. Therefore the network parameter may include correlated SSID and a password and so on, thus the pairing information is generated according to the network parameter. In addition, in order to ensure security, the password is sent to the media equipment after being encrypt, accordingly, the media equipment will also have to be informed the password of the network environment which is accessed soon after the decryption.

Step S133, switching the current network environment according to the access point to the network connection with the media equipment established by the access point.

In the embodiment, a current network environment where the network connection of the control terminal equipment is located is switched to the network connection with the media equipment established by the access point, to facilitate information transmission between the control terminal equipment and the media equipment.

Step S135, sending the pairing information to the media equipment via the network connection.

In the embodiment, the pairing information is sent to the media equipment via the network connection between the control terminal equipment and the media equipment.

Figure 4:
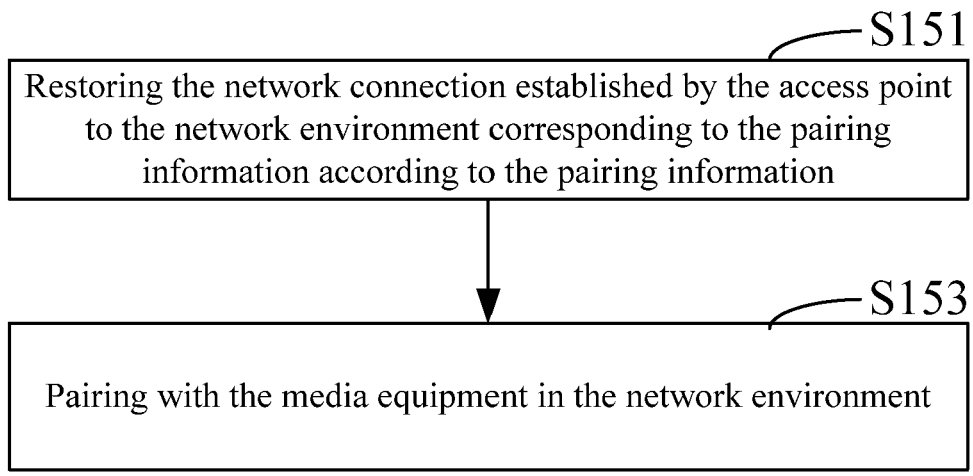
FIG. 4 is a flowchart illustrating a method for accessing to network environment corresponding to the pairing information, and pairing with the media equipment in the network environment according to one embodiment of the present disclosure.

As illustrated in FIG. 4, in one embodiment, the step S150 includes:

Step S151, restoring the network connection established via the access point to the network environment corresponding to the pairing information according to the pairing information.

In the embodiment, after the pairing information is sent, the current network connection of the control terminal equipment is disconnected, and switched to the original network environment.

Step S153, pairing with the media equipment in the network environment.

In the embodiment, the control terminal equipment and the media equipment will identify each other in the network environment, to complete the media equipment initialization, at this time, in the network environment a remote operation on the media equipment may be triggered randomly by the control terminal equipment, to achieve the manipulation of the media equipment operation.

Figure 5:
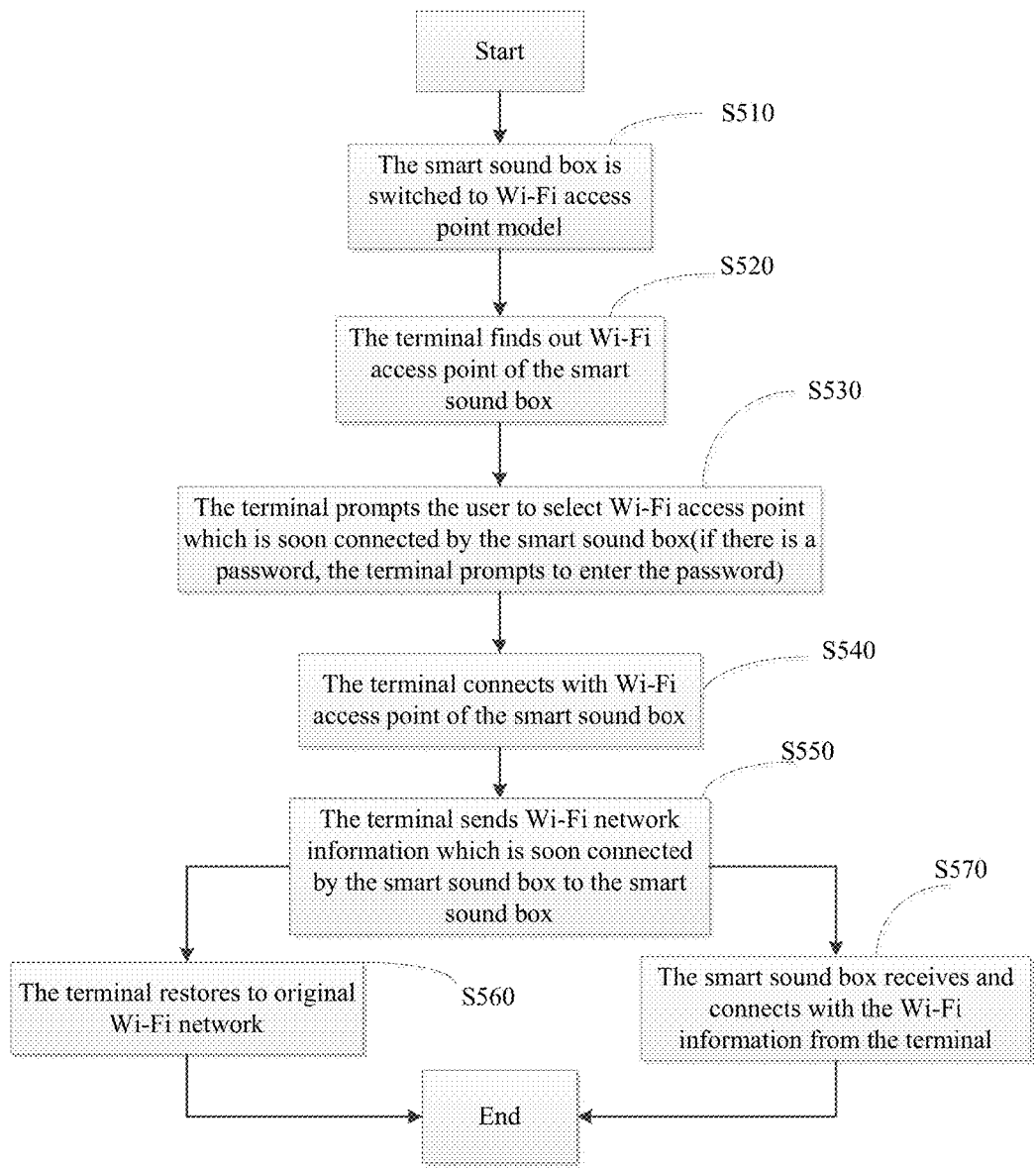
FIG. 5 is a schematic diagram illustrating an application for initializing a media equipment according to one embodiment of the present disclosure.
Figure 6:
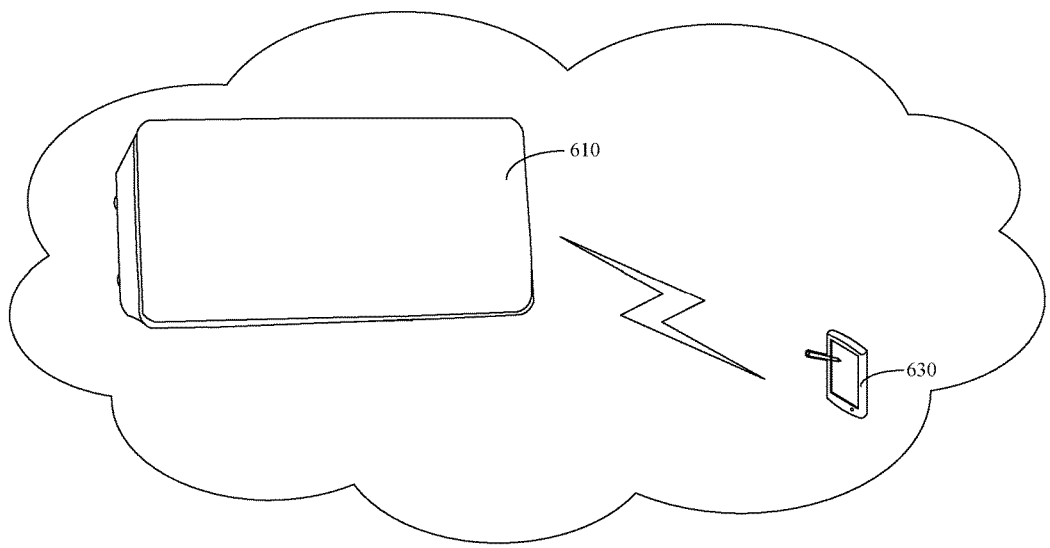
FIG. 6 is a schematic diagram illustrating an application scene for initializing a media equipment according to one embodiment of the present disclosure.

The method for initializing a media equipment is described in detail with reference to a specific embodiment. As illustrated in FIGS. 5 and 6, in the embodiment, the media equipment is a smart sound box 610, an initialization is realized by running a terminal application in the control terminal equipment 630 (i.e. the terminal as shown in FIG. 5).

Specifically, as in the step S510 to the step S540, the smart sound box 610 is first switched to Wi-Fi Access Point model, and the smart sound box 610 is as the access point. At this time, the terminal will find out the access point, the smart sound box 610, and the network connection will be performed between the smart sound box 610 and the terminal through the access point. If the smart sound box 610 further sets a password for a shared network, then the terminal will prompt the user to enter the password, and after the password entered by the user is obtained and verified successfully, the network whose access point is the smart sound box 610 is accessed.

With reference to the step S550 to the step S570, the terminal will obtain the network parameter to generate the pairing information, the network parameter is SSID, a password, encryption means and identity verification means and so on of the network environment before the network with the smart sound box 610 as the access point is accessed. The terminal sends the pairing information to the media equipment via the network connection between the smart sound box 610 and the terminal.

After sending the pairing information, the terminal disconnects the network connection with the smart sound box 610, restores to original network environment; accordingly, the smart sound box 610 is accessed to the network environment according to the received pairing information to be paired with the terminal, achieving the media equipment initialization.

Accordingly, a method for initializing a media equipment is further provided, which is applied into the media equipment, and achieves the media equipment initialization through interaction with the control terminal equipment.

Figure 7:
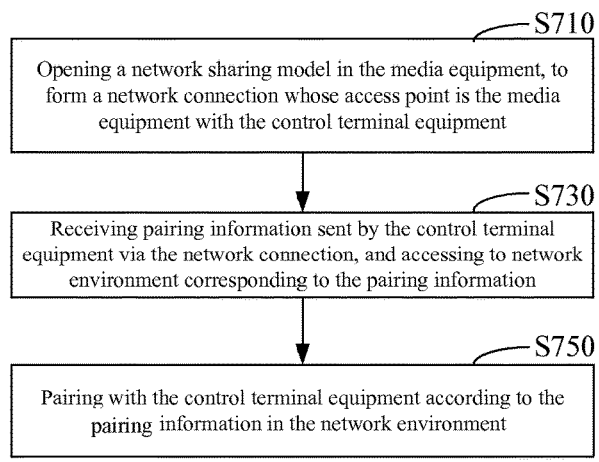
FIG. 7 is a flowchart illustrating a method for initializing a media equipment according to one embodiment of the present disclosure.

As illustrated in FIG. 7, in one embodiment, a method for initializing a media equipment includes the following steps:

Step S710, opening a network sharing model in the media equipment, to form a network connection whose access point is the media equipment with the control terminal equipment.

Step S730, receiving pairing information sent by the control terminal equipment via the network connection, and accessing to network environment corresponding to the pairing information.

Step S750, pairing with the control terminal equipment according to the pairing information in the network environment.

Figure 8:
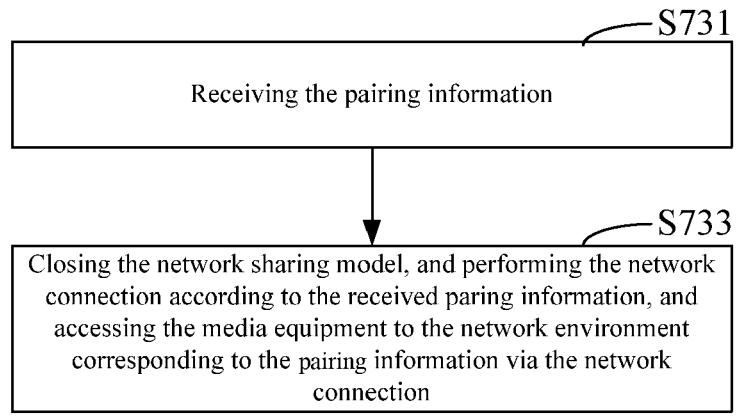
FIG. 8 is a flowchart illustrating the method of FIG. 7 for receiving pairing information sent by the control terminal equipment via the network connection, and accessing to network environment corresponding to the pairing information.

As illustrated in FIG. 8, in one embodiment, the step S730 includes:

Step S731, receiving the pairing information.

Step S733, closing the network sharing model, and performing the network connection according to the received pairing information, and accessing the media equipment to the network environment corresponding to the pairing information via the network connection.

Accordingly, a method for initializing a media equipment is further provided, which is run in the control terminal equipment and the media equipment, and the media equipment initialization is realized by network interaction between the control terminal equipment and the media equipment.

Figure 9:
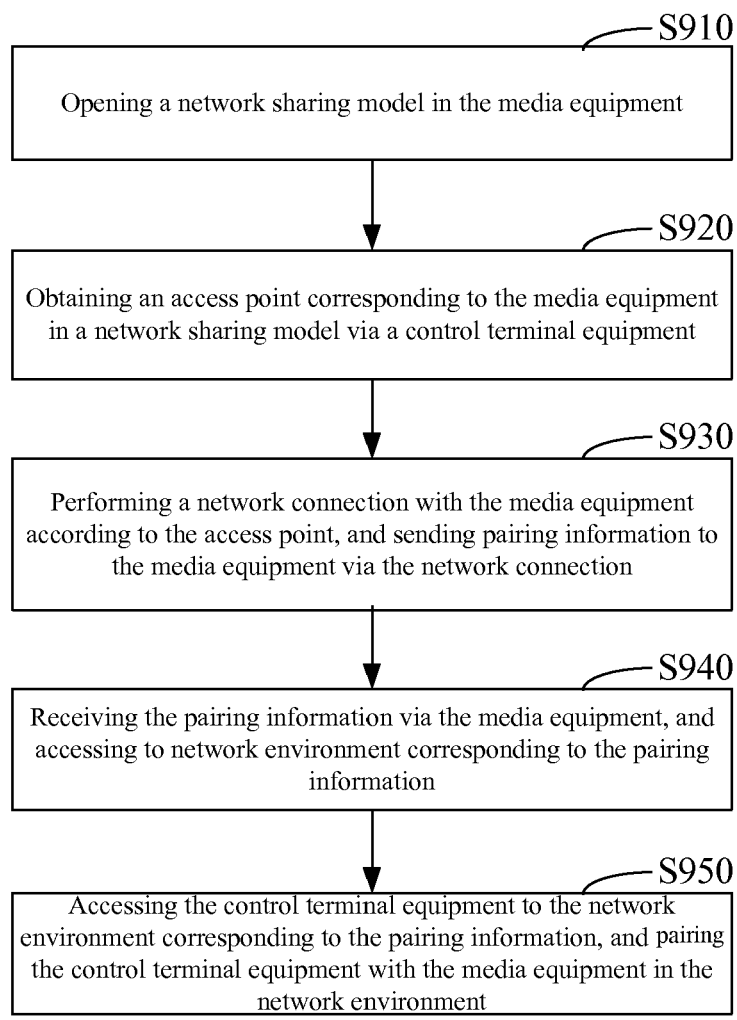
FIG. 9 is a flowchart illustrating a method for initializing a media equipment according to one embodiment of the present disclosure.

As illustrated in FIG. 9, in one embodiment, a method for initializing a media equipment includes the following steps.

Step S910, opening a network sharing model in the media equipment.

Step S920, obtaining an access point corresponding to the media equipment in a network sharing model via a control terminal equipment.

Step S930, performing a network connection with the media equipment according to the access point, and sending pairing information to the media equipment via the network connection.

Step S940, receiving the pairing information via the media equipment, and accessing to network environment corresponding to the pairing information.

Step S950, accessing the control terminal equipment to the network environment corresponding to the pairing information, and pairing the control terminal equipment with the media equipment in the network environment.

Figure 10:
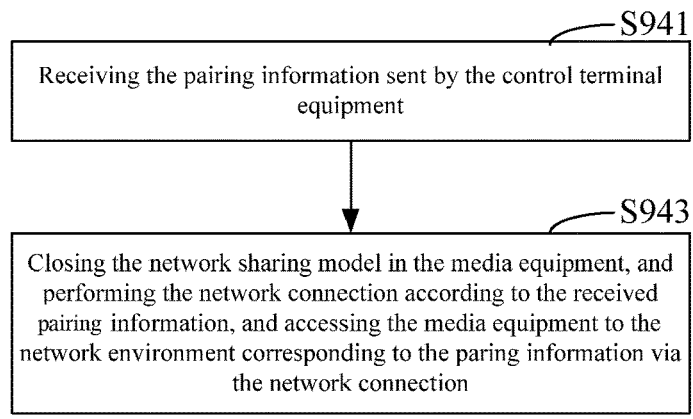
FIG. 10 is a flowchart illustrating the method of FIG. 9 for receiving pairing information via the media equipment, and accessing to network environment corresponding to the pairing information.

As illustrated in FIG. 10, in one embodiment, the step S940 includes: Step S941, receiving the pairing information sent by the control terminal equipment.

Step S943, closing the network sharing model in the media equipment, and performing the network connection according to the received pairing information, and accessing the media equipment to the network environment corresponding to the pairing information via the network connection.

In one embodiment, the step S920 includes: accessing to a current network environment where the media equipment is located via the control terminal equipment, and obtaining the access point corresponding to the media equipment in a network sharing model by performing equipment filtration in the current network environment.

Figure 11:
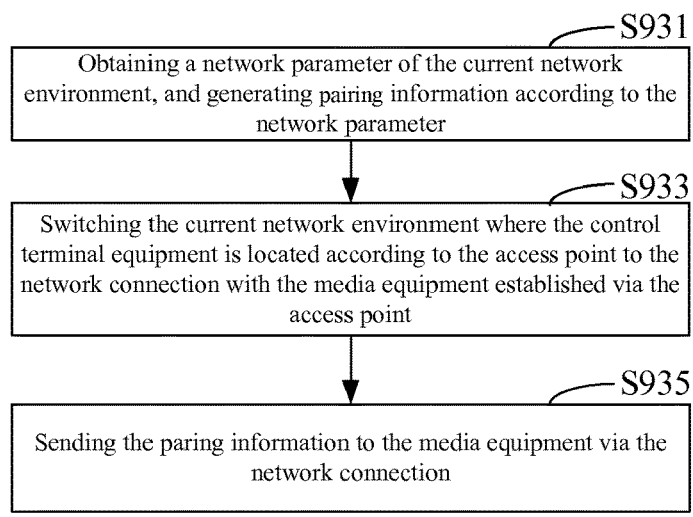
FIG. 11 is a flowchart illustrating the method of FIG. 9 for performing network connection with the media equipment according to an access point, and sending pairing information to the media equipment via the network connection.

As illustrated in FIG. 11, in one embodiment, the step S930 includes: Step S931, obtaining a network parameter of the current network environment, and generating pairing information according to the network parameter.

Step S933, switching the current network environment where the control terminal equipment is located according to the access point to the network connection with the media equipment established via the access point.

Step S936, sending the pairing information to the media equipment via the network connection.

Figure 12:
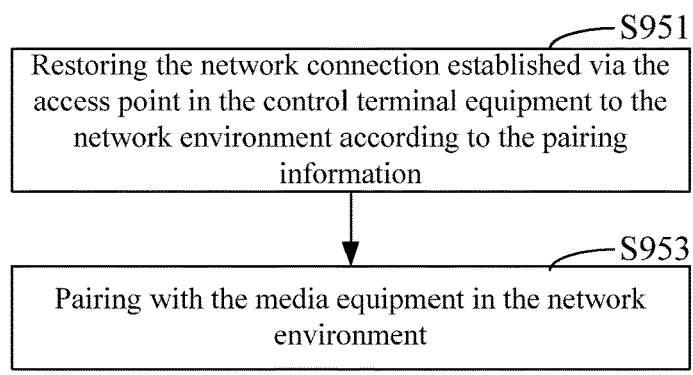
FIG. 12 is a flowchart illustrating the method of FIG. 9 for accessing the control terminal equipment to network environment corresponding to the pairing information, and pairing with the media equipment in the network environment.

As illustrated in FIG. 12, in one embodiment, the step S950 includes: Step S951, restoring the network connection established via the access point in the control terminal equipment to the network environment according to the pairing information.

Step S953, pairing with the media equipment in the network environment.

Figure 13:
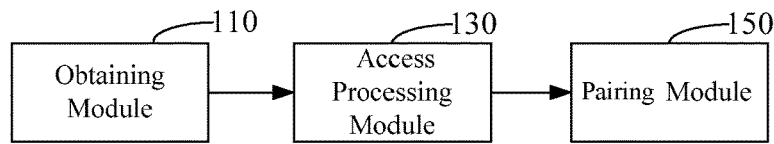
FIG. 13 is a schematic diagram illustrating a structure of a system for initializing a media equipment according to one embodiment of the present disclosure.

As illustrated in FIG. 13, in one embodiment, a system for initializing a media equipment includes an obtaining module 110, an access processing module 130, and a pairing module 150.

The obtaining module 110 is configured to obtain an access point corresponding to a media equipment in a network sharing model.

In the embodiment, the media equipment is embedded into a computer system, for playing media files such as audio files, video files etc. Network sharing model such as Wi-Fi Access Point model in the media equipment is opened, and at this time, one network which has the media equipment as a hot point is formed, and the network corresponds to a single access point. UPnP model is started up to perform a device finding to obtain an access point, wherein the access point may be obtained by searching a SSID name, or by a special field in a broadcast message.

In one embodiment, the obtaining module 110 is further configured to access to a current network environment where the media equipment is located, and obtain the access point corresponding to the media equipment in a network sharing model by performing equipment filtration in the current network environment.

In the embodiment, the control terminal equipment for remote controlling the media equipment is accessed to the current network environment, and further the obtaining module 110 searches in the network environment according to SSID name or a custom protocol field, to obtain the access point corresponding to the media equipment in the network sharing model. For example, after Wi-Fi function of the control terminal equipment is opened, a variety of Wi-Fi lists obtained are lists formed by multiple access points. Accordingly, the obtaining module 110 is needed to filter the access points, to obtain the access point corresponding to the media equipment.

Furthermore, the obtaining module 110 can search the SSID name by a key word, to obtain the access point whose SSID matches with the key word, and the access point is the access point corresponding to the media equipment in the network sharing model. For example, the obtaining module 110 judges whether the key word exists in the SSID corresponding to the obtained access point by search, if yes, then the access point is the access point corresponding to the media equipment in the network sharing model.

Furthermore, the obtaining module 110 may perform a filtration by a custom protocol field, that is, the custom protocol field is loaded in a communication protocol broadcast by Wi-Fi, and after a message broadcast is received, whether the message includes the custom protocol field is judged, if yes, the access point corresponding to the media equipment in the network sharing model may be obtained only according to the message, realizing accurate filtration of the device.

The access processing module 130 is configured to perform a network connection with the media equipment via the access point, and send pairing information to the media equipment via the network connection.

In the embodiment, the media equipment transforms a received network signal to Wi-Fi (wireless fidelity) signal, and sends out Wi-Fi signal, and then the media equipment becomes an access point. The access processing module 130 accesses the control terminal equipment to a network formed by the media equipment as an access point, to achieve the network connection with the media equipment via the access point. In addition, if the network is set a password, then a prompt message is pop-up to prompt the user to enter the password, and then identity verification is performed after the password entered by the user is obtained, and then after verification the network whose access point is the media equipment can be accessed.

Furthermore, after the network connection between the media equipment and the control terminal equipment is established, the access processing module 130 obtains network parameters associated with the access point of original network environment, such as SSID, a password, etc., to generate corresponding pairing information, and the pairing information is sent to the media equipment via the network connection through calling UPnP Action.

The pairing module 150 is configured to access to network environment corresponding to the pairing information, and pair the control terminal equipment with the media equipment in the network environment.

In the embodiment, the pairing module 150 in the control terminal equipment is accessed to the network environment corresponding to the pairing information through an operation triggered by the user, wherein, the operation triggered by the user is an operation on selecting the access point corresponding to the network environment and an operation on entering a password etc.

The media equipment receiving the pairing information will obtain the SSID, password and other information of the access point of the network environment which will be soon accessed, and then a verification is performed by a password to enter to the network environment, then the media equipment and the control terminal equipment are both in the network environment, they can easily identify and pair with each other, to complete media equipment initialization.

The system for initializing a media equipment is achieved by an application running in the control terminal equipment and a computer program embedded in the media equipment, and the media equipment initialization can be achieved without the need of complicated page setting and complicated operation, which simplifies the operation, reduces leaning cost on learning an operation of the media equipment initialization, and thereby reduces a threshold of initializing the media equipment.

Further, the application corresponding to the system for initializing a media equipment will be run in one or more control terminal equipments, the media equipment initialization is achieved by performing a program of the application, which greatly improves scalability, and does not require additional devices.

Figure 14:
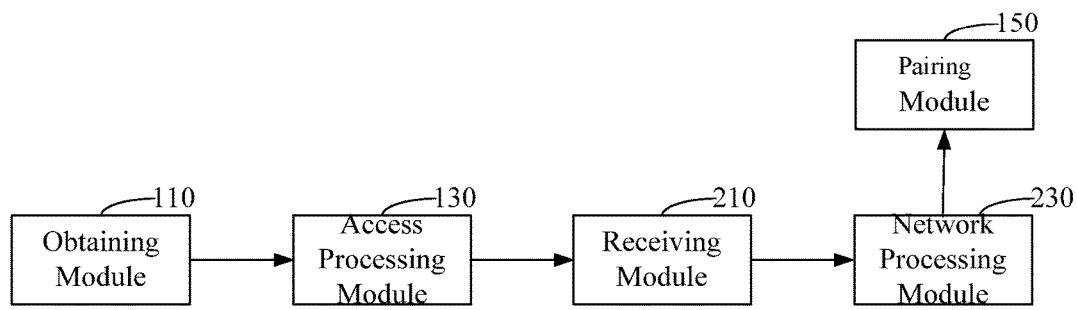
FIG. 14 is a schematic diagram illustrating a structure of a system for initializing a media equipment according to another embodiment of the present disclosure.

As illustrated in FIG. 14, in one embodiment, the system further includes a receiving module 210 and a network processing module 230.

The receiving module 210 is configured to receive the pairing information. In the embodiment, the receiving module 210 receives the pairing information sent by the control terminal equipment.

The network processing module 230 is configured to close the network sharing model, and perform the network connection according to the received pairing information, and access the media equipment to the network environment corresponding to the pairing information via the network connection.

In the embodiment, the network processing module 230 closes the current network sharing model opened by the media equipment, and accordingly, the network connection whose access point is the media equipment performed by the control terminal equipment will also be closed, and the network processing module 230 switches to the original network environment where the control terminal equipment is located.

Figure 15:
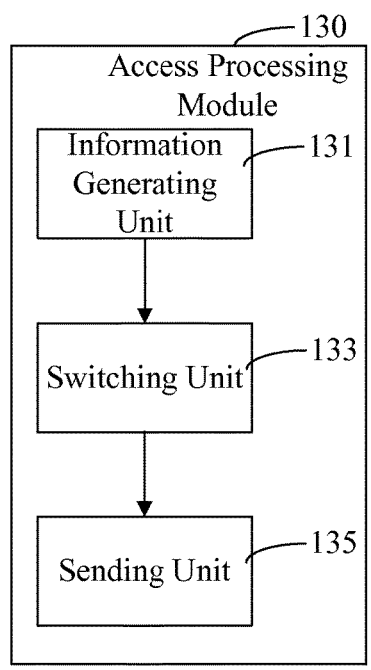
FIG. 15 is a schematic diagram illustrating a structure of an access processing module according to one embodiment of the present disclosure.

As illustrated in FIG. 15, in one embodiment, the access processing module 130 includes an information generating unit 131, a switching unit 133, and a sending unit 135.

The information generating unit 131 is configured to obtain a network parameter of the current network environment, and generate pairing information according to the network parameter.

In the embodiment, the information generating unit 131 obtains the network parameter corresponding to the network environment, and the network parameter is used to announce the network environment where the media equipment will be accessed soon and to achieve the assessment of the media equipment to the network environment. Therefore the network parameter may include correlated SSID and a password and so on, thus the pairing information is generated according to the network parameter. In addition, in order to ensure security, the password is sent to the media equipment by the sending unit 135 after being encrypt by the information generating unit 131, accordingly, the media equipment will also have to be informed the password of the network environment which is accessed soon after the decryption.

The switching unit 133 is configured to switch the current network environment according to the access point to the network connection with the media equipment established via the access point.

In the embodiment, the switching unit 133 switches the current network environment where the network connection of the control terminal equipment is located to network connection with the media equipment established by the access point, to facilitate information transmission between the control terminal equipment and the media equipment.

The sending unit 135 is configured to send the pairing information to the media equipment via the network connection.

In the embodiment, the sending unit 135 sends the pairing information to the media equipment via the network connection between the control terminal equipment and the media equipment.

Figure 16:
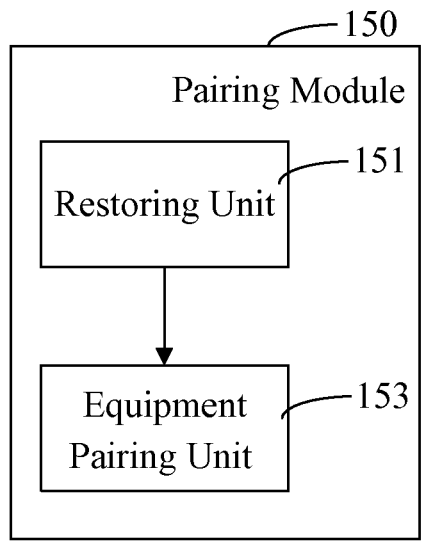
FIG. 16 is a schematic diagram illustrating a structure of a pairing module according to one embodiment of the present disclosure.

As illustrated in FIG. 16, in one embodiment, the pairing module 150 includes a restoring unit 151 and an equipment pairing unit 153.

The restoring unit 151 is configured to restore the network connection established via the access point to the network environment according to the pairing information.

In the embodiment, after the pairing information is sent, the restoring unit 151 disconnects the current network connection of the control terminal equipment, and switches to the original network environment.

The equipment pairing unit 153 is configured to pair with the media equipment in the network environment.

In the embodiment, the equipment pairing unit 153 and the media equipment distinguish each other in the network environment, to complete the media equipment initialization, at this time, in the network environment a remote operation on the media equipment may be triggered randomly by the control terminal equipment, to achieve the manipulation of the media equipment operation.

Accordingly, a device for initializing a media equipment is further provided, which is applied to the media equipment, and achieves the media equipment initialization through interaction with the control terminal equipment.

Figure 17:
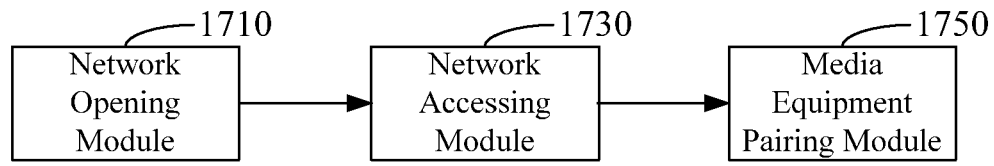
FIG. 17 is a schematic diagram illustrating a structure of a device for initializing a media equipment according to one embodiment of the present disclosure.

As illustrated in FIG. 17, in one embodiment, a device for initializing a media equipment includes a network opening module 1710, a network accessing module 1730, and a media equipment pairing module 1750.

The network opening module 1710 is configured to open a network sharing model in media equipment, to form a network connection whose access point is the media equipment with the control terminal equipment.

The network accessing module 1730 is configured to receive pairing information, and access to network environment corresponding to the pairing information.

The media equipment pairing module 1750 is configured to be paired with the control terminal equipment according to the pairing information in the network environment.

Figure 18:
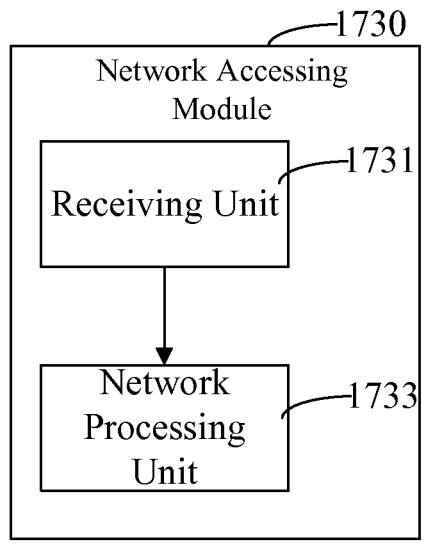
FIG. 18 is a schematic diagram illustrating a structure of a network accessing module of FIG. 17.

As illustrated in FIG. 18, in one embodiment, the network accessing module 1730 includes a receiving unit 1731 and a network processing unit 1733.

The receiving unit 1731 is configured to receive the pairing information.

The network processing unit 1733 is configured to close the network sharing model, and perform the network connection according to the received pairing information, and access the media equipment to the network environment corresponding to the pairing information via the network connection.

Accordingly, a system for initializing a media equipment is further provided, which is run in the control terminal equipment and the media equipment, and the media equipment initialization is realized by network interaction between the control terminal equipment and the media equipment.

Figure 19:
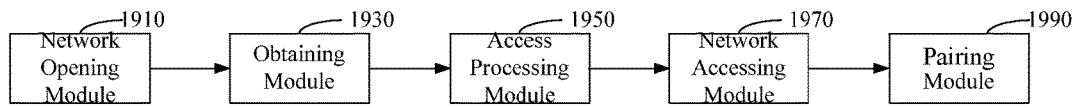
FIG. 19 is a schematic diagram illustrating a structure of a system for initializing a media equipment according to one embodiment of the present disclosure.

As illustrated in FIG. 19, in one embodiment, a system for initializing a media equipment includes a network opening module 1910, an obtaining module 1930, an access processing module 1950, a network accessing module 1970, and a pairing module 1990.

The network opening module 1910 is configured to open a network sharing model in media equipment.

The obtaining module 1930 is configured to obtain an access point corresponding to a media equipment in a network sharing model via a control terminal equipment.

The access processing module 1950 is configured to perform a network connection with the media equipment via the access point, and send pairing information to the media equipment via the network connection.

The network accessing module 1970 is configured to receive pairing information via the media equipment, and access to network environment corresponding to the pairing information.

The pairing module 1990 is configured to access to network environment corresponding to the pairing information via the control terminal equipment, and be paired with the media equipment in the network environment.

Figure 20:
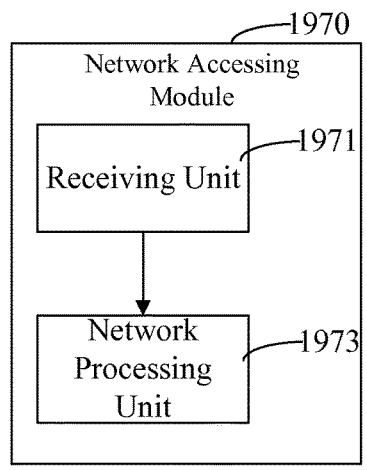
FIG. 20 is a schematic diagram illustrating a structure of a network accessing module of FIG. 19.

As illustrated in FIG. 20, in one embodiment, the network accessing module 1970 includes a receiving unit 1971 and a network processing unit 1973.

The receiving unit 1971 is configured to receive the pairing information sent by the control terminal equipment.

The network processing unit 1973 is configured to close the network sharing model in the media equipment, and perform the network connection according to the received pairing information, and access the media equipment to the network environment corresponding to the pairing information via the network connection.

In one embodiment, the obtaining module 1930 is further configured to access to a current network environment where the media equipment is located via the control terminal equipment, and obtain the access point corresponding to the media equipment in a network sharing model by performing equipment filtration in the current network environment.

Figure 21:
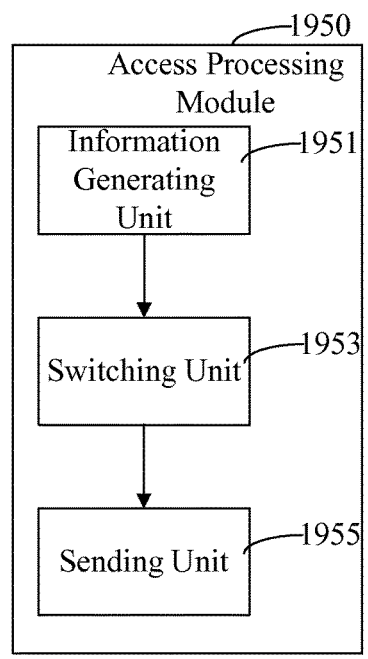
FIG. 21 is a schematic diagram illustrating a structure of an access processing module of FIG. 19.

As illustrated in FIG. 21, in one embodiment, the access processing module 1950 includes an information generating unit 1951, a switching unit 1953, and a sending unit 1955.

The information generating unit 1953 is configured to obtain a network parameter of the current network environment, and generate pairing information according to the network parameter;

The switching unit 1953 is configured to switch a current network environment where the control terminal equipment is located according to the access point to the network connection with media equipment established via the access point;

The sending unit 1955 is configured to send the pairing information to the media equipment via the network connection.

Figure 22:
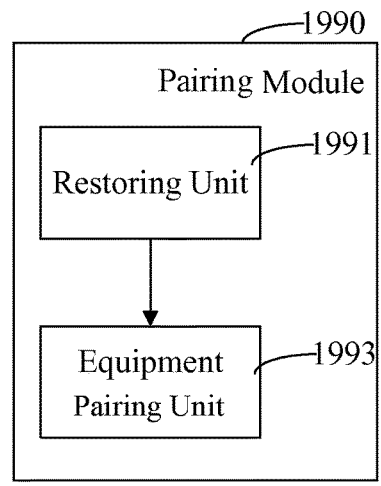
FIG. 22 is a schematic diagram illustrating a structure of a pairing module of FIG. 19.

As illustrated in FIG. 22, in one embodiment, the pairing module 1990 includes a restoring unit 1991 and an equipment pairing unit 1993.

The restoring unit 1991 is configured to restore the network connection established via the access point in the control terminal equipment to the network environment according to the pairing information.

The equipment pairing unit 1993 is configured to pair with the media equipment in the network environment.

The method, system, device, computer-readable storage medium for initializing a media equipment, achieves the media equipment initialization by obtaining an access point corresponding to a media equipment in a network sharing model; performing a network connection with the media equipment via the access point, and sending pairing information to the media equipment via the network connection; at this time, accessing to network environment corresponding to the pairing information, and pairing with the media equipment in the network environment. For a user, it is only needed to enter a corresponding network parameter to generate pairing information to complete the initialization, which greatly simplifies the operation of the media equipment initialization, and does not need to replace or add an additional equipment, ensuring a low cost of money.

A person skilled in the art will understand that the performance of all or part of the process of the method in the embodiments can be achieved by a computer program to instruct a hardware run in relevant mobile terminal. The computer program may be stored in a computer-readable storage medium connected to the mobile terminal, and when the computer program is implemented, it may include the process described in the embodiments of the method. Wherein the storage medium may be a magnetic disk, optical disk, read only memory (ROM), or random access memory (RAM), etc.

Figure 23:
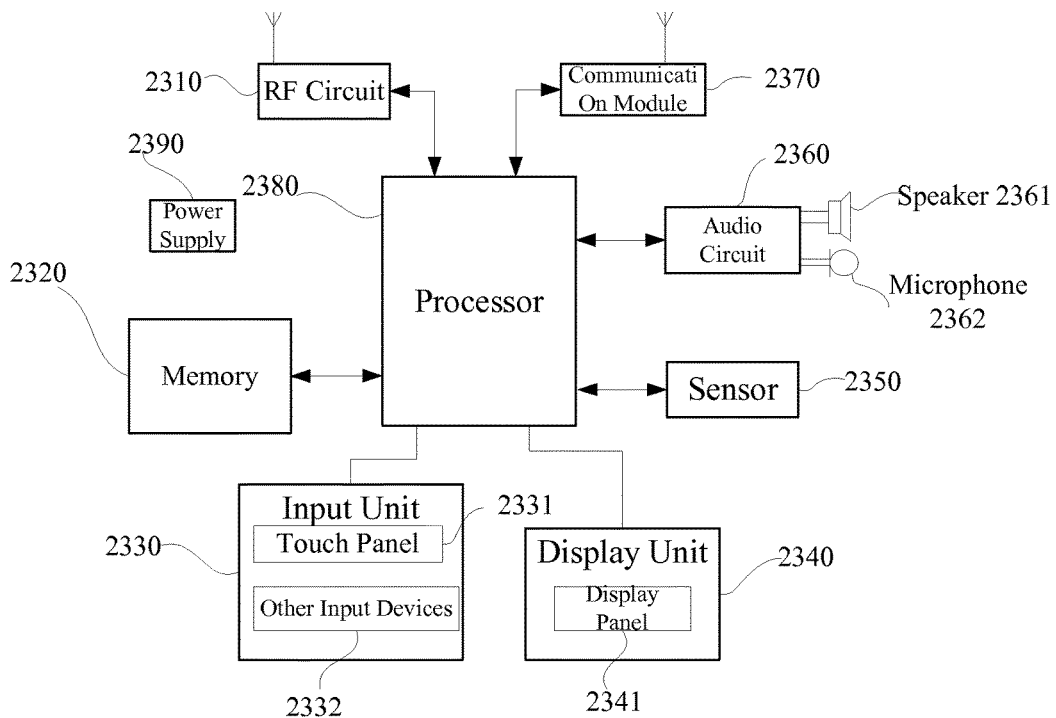
FIG. 23 is a schematic diagram illustrating a structure of a terminal which runs an application program of initializing a media equipment according to one embodiment of the present disclosure.

The embodiment of the present disclosure further provides another terminal for running an application program of initializing a media equipment. As illustrated in FIG. 10, for convenience of description, only a portion related to the embodiment of the present disclosure is showed, and the portion whose specific technical details do not disclose is referred to the method of the embodiment of the present disclosure. The terminal may include a mobile phone, a tablet PC, PDA (Personal Digital Assistant), POS (Point of Sales), on-board computer and other terminal devices. As an example, the terminal is a mobile phone:

FIG. 23 is a block diagram illustrating a part of the structure of a mobile phone associated with the terminal according to an embodiment of the present disclosure. With reference to FIG. 23, the mobile phone includes: RF (Radio Frequency, RF) circuit 2310, a memory 2320, an input unit 2330, a display unit 2340, a sensor 2350, an audio circuit 2360, a communication module 2370, a processor 2380, and a power supply 2390 and other components. A person skilled in the art understands that the structure of the mobile phone in FIG. 23 do not limit the mobile phone, and the mobile phone may include more or less components than that illustrated, or a combination of some of the components, or different arrangement of the components.

Various components of the mobile phone will be specifically described in the following with reference to FIG. 23:

The RF circuit 2310 may be configured to receive and send a signal during a process of sending and receiving a message and calling, in particular, to receive a downlink message of a base station for processing of the processor 2380, and send design uplink data to the base station. Normally, the RF circuit 2310 includes, but not limited, at least an amplifier, a transceiver, a coupler, a low noise amplifier (LNA), diplexer etc. Furthermore, the RF circuit 2310 may also communicate with other devices through wireless communication and network. The wireless communication may use any communication standard or protocol, including but not limited Global System of Mobile communication (GSM), General Packet Radio Service (GPRS), Code Division Multiple Access (CDMA), Wideband Code Division Multiple Access (WCDMA), Long Term Evolution (LTE), email and Short Messaging Service (SMS), and so on.

The memory 2320 may be configured to store software programs and modules, and the processor 2380 performs the media equipment initialization by running the software programs for initializing the media equipment stored in the memory 2320. The memory 2320 may mainly include a program memory area and a data memory area, wherein the program memory area may store an operating system, a software program for initializing the media equipment, an application program needed by at least one function (such as sound playing function, image playing function etc.) and so on. The data memory area may store the data (such as audio data, phone book, etc.) created by using the mobile phone. In addition, the memory 2320 may include high-speed random access memory and non-volatile memory, for example at least one disk memory, flash memory, or other volatile solid-state memory device.

The input unit 2330 may also be configured to receive input digital or character information, and generate key signal input associated with a user setting of the mobile phone 2300 and function control. In particular, the input unit 2330 may include a touch panel 2331 and other input devices 2332. The touch panel 2331 is also referred to a touch screen, which can collect a touch operation (such as the user operates on or near the touch panel 2331 with a finger, a touch pen, or any other suitable objects or accessories) on or near the touch screen, and drive a corresponding connection device according to a pre-set program. Alternatively, the touch panel 2331 may include a touch detecting device and a touch controller. Wherein, the touch detecting device detects a user touch orientation, and detects a signal from a touch operation, and then sends the signal to the touch controller. The touch controller receives touch information from the touch detecting device, and converts it into a contact coordinate which is then sent to the processor 2380, and receives and implements an instruction sent by the processor 2380. Furthermore, the touch panel 2331 may be implemented by resistive, capacitive, infrared and surface acoustic wave and other types. In addition to the touch panel 2331, the input unit 2330 further includes other input devices 2332. In particular, the other input devices 2332 may include one or more selected from, but not limited, a physical keyboard, a function key (such as a volume control key, a switch key, etc.), a trackball, a mouse, an operating lever.

The display unit 2340 may be figured to display information input by the user or information provided to the user and various menus of the mobile phone. The display unit 2340 may include a display panel 2341, and optionally, the display panel 2341 may adopt Liquid Crystal Display (LCD), Organic Light-Emitting Diode (OLED) and so on. Further, the touch panel 2331 may cover the display panel 2341. When the touch panel 2331 detects the touch operation on or near the touch panel, it sends the touch operation to the processor 2380 to determine a type of a touch event, and then the processor 2380 provides a corresponding visual output on the display panel 2341 according to the type of the touch event. Although in FIG. 23, the touch panel 2331 and the display panel 2341 achieve input and output functions as two separate components, in some embodiments, the touch panel 2331 and the display panel 2341 may be integrated to achieve input and output functions of the mobile phone.

The mobile phone 2300 may further include at least one sensor 2350, such as a light sensor, a motion sensor and other sensors. In particular, the light sensor may include an ambient light sensor and proximity sensor. Wherein the ambient light sensor may adjust brightness of the display panel 2341 according to brightness of ambient light, and the proximity sensor is able to close the display panel 2341 and/or backlight when the mobile phone is moved to ears. As a motion sensor, an accelerometer sensor may detect magnitude of acceleration in each direction (typically in tri-axis), and magnitude and direction of gravity when in stationary, and may be used in an application on identifying phone posture (such as horizontal and vertical screen switched, a correlated game, magnetometer attitude calibration), a relevant function of identifying vibration and so on. The mobile phone may also be configured with a gyroscope, a barometer, a hygrometer, a thermometer, an infrared sensor, and other sensors, and which is not repeated herein.

The audio circuit 2360, a speaker 2361, a microphone 2362 can provide an audio interface between the user and the mobile phone. The audio circuit 2360 may send an electrical signal transmitted by the received audio data to the speaker 2361, and then the electrical signal is transmitted to a sound signal by the speaker 2361 to be output. On the other hand, the microphone 2362 transmits the collected sound signal to the electrical signal, and after received by the audio circuit 2360, the electrical signal is transmitted into the audio data which is then output, and after the audio data is processed by the processor 2380, the audio data is sent to another mobile phone via the RF circuit 2310, or the audio data is sent to the memory 2320 or further procession.

The communication module 2370 may be wireless fidelity (Wi-Fi) module, and Wi-Fi belongs to short-range wireless transmission technology. The mobile phone can help the user to send and receive email, browse the webpage and access streaming media etc. through the communication module 2370 which provides the user with wireless broadband internet access. Although FIG. 23 shows the communication module 2370, but it is understood that it is not a necessary component of the mobile phone 2300, and it may be omitted without changing the nature of the present disclosure.

The processor 2380 is a control center the mobile phone, which connects various parts of the mobile phone by various interfaces and circuits, implements various functions of the mobile phone and processes data by running and executing the software program and/or module stored in the memory 2320 and by calling data stored in the memory 2320, thus overall monitoring the mobile phone. Alternatively, the processor 2380 may include one or more processing units. Preferably, the processor 2380 may integrate an application processor and a modem processor, wherein the application processor mainly processes the operating system, a user interface and the application program etc., and the modem processor mainly processes wireless communication. It is understood that the modem processor also may not be integrated into the processor 2380.

The mobile phone 2300 further includes a power supply 2390 (such as a battery) supplying to each member, preferably, the power supply may be logically connected with the processor 2380 via a power supply management system, thus functions such as charging, discharging, and power management etc. can be achieved by the power supply management system.

Although not shown, the mobile phone 2300 may also include a camera, a bluetooth module, which is not repeated herein.

In one embodiment, the processor 2380 included in the terminal, which runs the software program for initializing the media equipment in the memory 2320, performs the following functions:

obtaining an access point corresponding to a media equipment in a network sharing model;

performing a network connection with the media equipment via the access point, and sending pairing information to the media equipment via the network connection;

and accessing to network environment corresponding to the pairing information, and pairing the control terminal equipment with the media equipment in the network environment.

In one embodiment, the step of obtaining an access point corresponding to a media equipment in a network sharing model includes:

accessing to a current network environment where the media equipment is located, and obtaining the access point corresponding to the media equipment in the network sharing model by performing equipment filtration in the current network environment.

In one embodiment, the step of performing a network connection with the media equipment via the access point, and sending pairing information to the media equipment via the network connection includes:

obtaining a network parameter of the current network environment, and generating pairing information according to the network parameter;

switching the current network environment where the control terminal equipment is located according to the access point to the network connection with the media equipment established via the access point; and sending the pairing information to the media equipment via the network connection.

In one embodiment, the step of accessing to network environment corresponding to the pairing information, and pairing the control terminal equipment with the media equipment in the network environment includes:

restoring the network connection established via the access point to the network environment according to the pairing information; and pairing with the media equipment in the network environment.

The foregoing are only several embodiments of the present disclosure, of which the description are more specific and detailed, it is to be understood that the embodiments are not to be limited to the scope of the present disclosure. It should be noted that, for a person skilled in the art, a number of variations and modifications may be made without departing from the inventive concept or scope of the present disclosure. Accordingly, the protection scope of the present disclosure is subject to the appended claims.

The invention claimed is:

1. A method for initializing a media equipment, comprising:

enabling a network sharing model of the media equipment to have an access point for a control terminal equipment to connect to the media equipment, so that a network that has the media equipment as a hotspot is formed, and the formed network corresponds to only the access point, wherein the network sharing model is a Wi-Fi access point model;

performing equipment finding of the media equipment by the control terminal equipment;

obtaining, by the control terminal equipment, the access point corresponding to the media equipment in the network sharing model;

establishing, by the control terminal equipment, a first network connection with the media equipment via the access point in the formed network, and sending pairing information from the control terminal equipment to the media equipment via the first network connection in the formed network;

disenabling the network sharing model to disconnect the first network connection in the formed network whose access point is the media equipment after the pairing information is received by the media equipment, thereby switching to an original network environment where the control terminal equipment is originally in; and accessing, by the control terminal equipment, to the original network environment corresponding to the pairing information, establishing, by the control terminal equipment, a second network connection with the media equipment in the original network environment corresponding to the pairing information, pairing the control terminal equipment with the media equipment through the first network connection, and initiating the media equipment by the control terminal equipment through the second network connection in the original network environment where the control terminal equipment and the media equipment are both in, wherein establishing the first network connection with the media equipment via the access point in the formed network, and sending the pairing information to the media equipment via the first network connection in the formed network includes:

obtaining a network parameter of the formed network, and generating the pairing information corresponding to the network parameter;

switching to the formed network where the media equipment is located, and establishing the first network connection with the media equipment via the access point; and sending the pairing information to the media equipment via the first network connection in the formed network.

2. The method of claim 1, wherein obtaining the access point corresponding to the media equipment in the network sharing model comprises:

accessing to, by the control terminal equipment, the formed network where the media equipment is located, and obtaining the access point corresponding to the media equipment in the network sharing model by performing equipment filtration in the formed network.

3. The method of claim 1, wherein accessing to the original network environment corresponding to the pairing information, and pairing the control terminal connection with the media equipment through the second network connection comprises:

restoring the control terminal equipment from the first network connection to the second network connection according to the pairing information; and pairing the control terminal equipment with the media equipment in the second network connection.

4. A method for initializing a media equipment, comprising:

enabling a network sharing model of the media equipment to have an access point for a control terminal equipment to connect to the media equipment, so that a network that has the media equipment as a hotspot is formed, and the formed network corresponds to only the access point, wherein the network sharing model is a Wi-Fi access point model;

enabling Wi-Fi function of the control terminal equipment to perform equipment finding of the media equipment by the control terminal equipment;

establishing a first network connection in which the media equipment is in connection with the control terminal equipment via the access point of the media equipment in the formed network;

receiving, by the media equipment, pairing information sent by the control terminal equipment via the first network connection; disenabling the network sharing model to disconnect the first network connection in the formed network whose access point is the media equipment after the pairing information is received by the media equipment, thereby switching to an original network environment where the control terminal equipment is originally in; and establishing to the second network connection with the control terminal equipment in the original network environment corresponding to the pairing information; and pairing, by the media equipment, with the control terminal equipment according to the pairing information in the second network connection, and initiating initiation of the media equipment by the control terminal equipment through the second network connection in the original network environment where the control terminal equipment and the media equipment are both in, wherein establishing the first network connection in which the media equipment is in connection with the control terminal equipment via the access point of the media equipment in the formed network includes:

obtaining a network parameter of the formed network, and generating the pairing information corresponding to the network parameter;

switching to the formed network where the media equipment is located, and establishing the first network connection with the media equipment via the access point; and sending the pairing information to the media equipment via the first network connection in the formed network.

5. A method for initializing a media equipment, comprising:

enabling a network sharing model of the media equipment, so that a network that has the media equipment as a hotspot is formed, and the formed network corresponds to only the access point, wherein the network sharing model is a Wi-Fi access point model;

performing equipment finding of the media equipment by a control terminal equipment with an Universal Plug and Play (UPnP) model;

obtaining the access point corresponding to the media equipment in the network sharing model via the control terminal equipment;

establishing, by the control terminal equipment, a first network connection with the media equipment according to the access point in the formed network, and sending pairing information from the control terminal equipment to the media equipment via the first network connection in the formed network;

receiving, by the media equipment, the pairing information, disenabling the network sharing model to disconnect the first network connection in the formed network whose access point is the media equipment after the pairing information is received by the media equipment, thereby switching to an original network environment where the control terminal equipment is originally in;

establishing a second network connection between the media equipment and the control terminal equipment in the original network environment corresponding to the pairing information; and accessing the control terminal equipment to the second network connection corresponding to the pairing information, pairing the control terminal equipment with the media equipment through the second network connection, and initiating the media equipment by the control terminal equipment through the second network connection in the original network environment where the control terminal equipment and the media equipment are both in, wherein establishing, by the control terminal equipment, the second network connection with the media equipment according to the access point, and sending the pairing information to the media equipment via the second network connection comprises:

obtaining, by the control terminal equipment, a network parameter of the formed network, and generating the pairing information corresponding to the network parameter;

switching the control terminal equipment to the formed network where the first network connection with the media equipment is established via the access point; and sending the pairing information to the media equipment via the first network connection in the formed network.

6. The method of claim 5, wherein obtaining the access point corresponding to the media equipment in the network sharing model via the control terminal equipment comprises:

accessing to, by the control terminal equipment, the formed network where the media equipment is located via the control terminal equipment, and obtaining the access point corresponding to the media equipment in the network sharing model by performing equipment filtration in the formed network.

7. The method of claim 5, wherein accessing the control terminal equipment to the second network connection corresponding to the pairing information, and pairing the control terminal equipment with the media equipment in the original network environment comprises:

restoring the control terminal equipment from the first network connection to the second network connection according to the pairing information; and pairing the control terminal equipment with the media equipment in the original network environment.

8. A system for initializing a media equipment, comprising:

an enabling module, configured to enable a network sharing model of the media equipment, so that a network that has the media equipment as a hotspot is formed, and the formed network corresponds to only the access point, wherein the network sharing model is a Wi-Fi access point model;

an obtaining module, configured to perform equipment finding of the media equipment by the control terminal equipment and obtain the access point corresponding to the media equipment in the network sharing model;

an access processing module, configured to establish a first network connection with the media equipment via the access point in the formed network, and send pairing information to the media equipment via the first network connection in the formed network;

a network processing module, configured to disenable the network sharing model to disconnect the first network connection in the formed network whose access point is the media equipment after the pairing information is received by the media equipment, thereby switching to an original network environment where the control terminal equipment is originally in, perform network connection according to the received pairing information; and a pairing module, configured to establish a second network connection between the media equipment and the control terminal equipment in the original network environment corresponding to the pairing information, pair a control terminal equipment with the media equipment through the second network connection in the original network environment, and initiate the media equipment by the control terminal equipment through the second network connection in the original network environment where the control terminal equipment and the media equipment are both in, wherein the access processing module includes:

an information generating unit, configured to obtain a network parameter of the formed network, and generate the pairing information corresponding to the network parameter;

a switching unit, configured to switch the control terminal equipment to the formed network where the first network connection with the media equipment is established via the access point; and a sending unit, configured to send the pairing information to the media equipment via the first network connection in the formed network.

9. The system of claim 8, further comprising:

a receiving module, configured to receive the pairing information before the network processing module is configured to disenable the network sharing model.

10. The system of claim 8, wherein the obtaining module is further configured to access to the formed network where the media equipment is located, and obtain the access point corresponding to the media equipment in the network sharing model by performing equipment filtration in the formed network.

11. The system of claim 8, wherein the pairing module comprises:

a restoring unit, configured to restore the control terminal equipment from the first network connection to the second network connection according to the pairing information; and an equipment pairing unit, configured to pair with the control terminal equipment the media equipment in the second network connection.

12. A device for initializing a media equipment, comprising:

a network enabling module, configured to enable a network sharing model of the media equipment to have an access point for a control terminal equipment to connect to the media equipment, so that a network that has the media equipment as a hotspot is formed, and the formed network corresponds to only the access point, wherein the network sharing model is a Wi-Fi access point model;

a network obtaining module, configured to perform equipment finding of the media equipment by the control terminal equipment and obtain the access point corresponding to the media equipment in the network sharing model, to form a first network connection in which the media equipment is in connection with the control terminal equipment via the access point of the media equipment in the formed network;

a network accessing module, configured to receive pairing information, to disenable the network sharing model to disconnect the first network connection in the formed network whose access point is the media equipment after the pairing information is received by the media equipment, thereby switching to an original network environment where the control terminal equipment is originally in; and access the media equipment to the original network environment where the media equipment is located corresponding to the pairing information, and establish a second network connection between the media equipment and the control terminal equipment in the original network environment corresponding to the pairing information; and a media equipment pairing module, configured to be paired with the control terminal equipment according to the pairing information in the original network environment, and initiate the media equipment by the control terminal equipment through the second network connection in the original network environment where the control terminal equipment and the media equipment are both in, wherein the network processing module includes:

an information generating unit, configured to obtain a network parameter of the formed network, and generate the pairing information corresponding to the network parameter;

a switching unit, configured to switch the control terminal equipment to the formed network where the first network connection with the media equipment is established via the access point; and a sending unit, configured to send the pairing information to the media equipment via the first network connection in the formed network.

13. The device of claim 12, wherein the network accessing module comprises:

a receiving unit, configured to receive the pairing information before the network processing unit is configured to disenable the network sharing model.

14. A system for initializing a media equipment, comprising:

a network enabling module, configured to enable a network sharing model of the media equipment to have an access point for a control terminal equipment to connect to the media equipment, so that a network that has the media equipment as a hotspot is formed, and the formed network corresponds to only the access point, wherein the network sharing model is a Wi-Fi access point model, wherein the control terminal equipment is configured to perform equipment finding of the media equipment;

an obtaining module, configured to obtain the access point corresponding to the media equipment in the network sharing model via the control terminal equipment;

an access processing module, configured to establish a first network connection with the media equipment via the access point in the formed network, and send pairing information to the media equipment via the first network connection in the formed network;

a network accessing module, configured to receive the pairing information, to disenable the network sharing model to disconnect the second network connection in the formed network whose access point is the media equipment after the pairing information is received by the media equipment, thereby switching to an original network environment where the control terminal equipment is originally in; to access the media equipment to the original network environment where the media equipment is located corresponding to the pairing information, and establish a second network connection between the media equipment and the control terminal equipment in the original network environment corresponding to the pairing information; and a pairing module, configured to access the control terminal equipment to the second network connection corresponding to the pairing information, pair the control terminal equipment with the media equipment through the second network connection in the original network environment, and initiate the media equipment by the control terminal equipment through the second network connection in the original network environment where the control terminal equipment and the media equipment are both in, wherein the access processing module comprises:

an information generating unit, configured to obtain a network parameter of the formed network, and generate the pairing information corresponding to the network parameter;

a switching unit, configured to switch the control terminal equipment to the formed network where the first network connection with the media equipment is established via the access point; and a sending unit, configured to send the pairing information to the media equipment via the first network connection in the formed network.

15. The system of claim 14, wherein the network accessing module comprises:

a receiving unit, configured to receive the pairing information sent by the control terminal equipment before the network processing unit is configured to disenable the network sharing model of the media equipment.

16. The system of claim 14, wherein the obtaining module is further configured to access to the formed network environment where the media equipment is located, and obtain the access point corresponding to the media equipment in the network sharing model by performing equipment filtration in the formed network environment.

17. The system of claim 14, wherein the pairing module comprises:

a restoring unit, configured to restore the control terminal equipment from the first network connection to the second network connection according to the pairing information; and an equipment pairing unit, configured to pair with the control terminal equipment the media equipment in the second network connection.

\* \* \* \* \*